United States Patent [19]

Craft et al.

[11] Patent Number: 5,404,979
[45] Date of Patent: Apr. 11, 1995

[54] MOTOR VEHICLE MANUAL TRANSMISSION MODULAR CLUTCH ASSEMBLY

[75] Inventors: Barrie G. Craft, Washington; Joseph L. Bair, Royal Oak; Michael B. Grosse Erdmann, Rochester Hills; Edwin R. Murray, Macomb; George S. Traub, Ortonville; Gerda Rudolph, Rochester Hills; Peter Doll, Troy, all of Mich.; Heiko Schulz-Andres, Poppenhausen, Germany; David G. Buckingham, Berkley; Richard G. Reed, Royal Oak, both of Mich.

[73] Assignees: Chrysler Corporation, Auburn Hills; Sachs Automotive of America, Troy, both of Mich.

[21] Appl. No.: 250,508

[22] Filed: May 27, 1994

[51] Int. Cl.⁶ ............................................. F16D 13/75
[52] U.S. Cl. ............................ 192/70.25; 192/111 A
[58] Field of Search ............... 192/70.25, 70.19, 70.23, 192/111 A; 188/71.8

[56] References Cited

U.S. PATENT DOCUMENTS

| | | | |
|---|---|---|---|
| 3,995,723 | 12/1976 | Holcomb, Jr. | 188/71.8 X |
| 4,339,023 | 7/1982 | Maycock | 192/70.25 |
| 4,601,373 | 7/1986 | Després et al. | 192/70.25 X |
| 4,640,400 | 2/1987 | Nakane et al. | 192/70.25 |
| 4,682,002 | 8/1987 | Takeuchi | 192/70.25 |
| 4,832,164 | 5/1989 | Flotow | 192/111 |
| 5,069,322 | 12/1991 | Mizukami et al. | 192/70.25 |
| 5,080,212 | 1/1992 | Flotow et al. | 192/70.25 |
| 5,123,512 | 6/1992 | Nemoto et al. | 192/111 A X |
| 5,191,810 | 3/1993 | Craft et al. | 74/572 |
| 5,226,515 | 7/1993 | Hartshorn | 192/70.25 |
| 5,238,093 | 8/1993 | Campbell | 192/30 W |
| 5,251,737 | 10/1993 | Flotow et al. | 192/70.25 X |
| 5,307,730 | 5/1994 | Erwin | 188/71.8 X |
| 5,325,949 | 7/1994 | Dommett et al. | 192/70.25 |
| 5,349,882 | 9/1994 | Kamio | 192/111 A X |

*Primary Examiner*—Andrea L. Pitts
*Attorney, Agent, or Firm*—Reising, Ethington, Barnard, Perry & Milton

[57] ABSTRACT

A manual transmission modular clutch assembly has a flywheel, pressure plate and interposed clutch plate mounted in a cover that is adapted to be connected to an engine crankshaft and wherein separate spring-torque straps connect the pressure plate and the flywheel to the cover for rotation therewith. At assembly the flywheel is positioned against the force of its spring-torque straps by travel limit pins that are retained on the cover, press fitted in the flywheel and contact with the pressure plate when in its clutch engaging position. A diaphragm spring normally clamps the pressure plate, clutch plate and flywheel together and is adapted to be connected to a clutch pedal to release the clutch. As wear occurs, the pressure plate is allowed to move further in the direction of the flywheel and forces the flywheel travel limit pins to move in their press fit by the same amount. This relocates the limit pins relative to the cover by the same amount so that when the clutch is released the flywheel is allowed to be moved by its spring-torque straps toward the pressure plate by a corresponding amount. A pair of rings having opposing contacting ramps are interposed between the cover and flywheel and are spring biased to expand apart by ramp action during clutch release and provide a wedge that holds the flywheel against the force of the diaphragm spring during clutch engagement following movement of the flywheel to adjust for wear. The flywheel travel limit pins also provide for setting the clutch apply load to a desired value at clutch assembly and this is maintained by the wear adjustment.

18 Claims, 4 Drawing Sheets

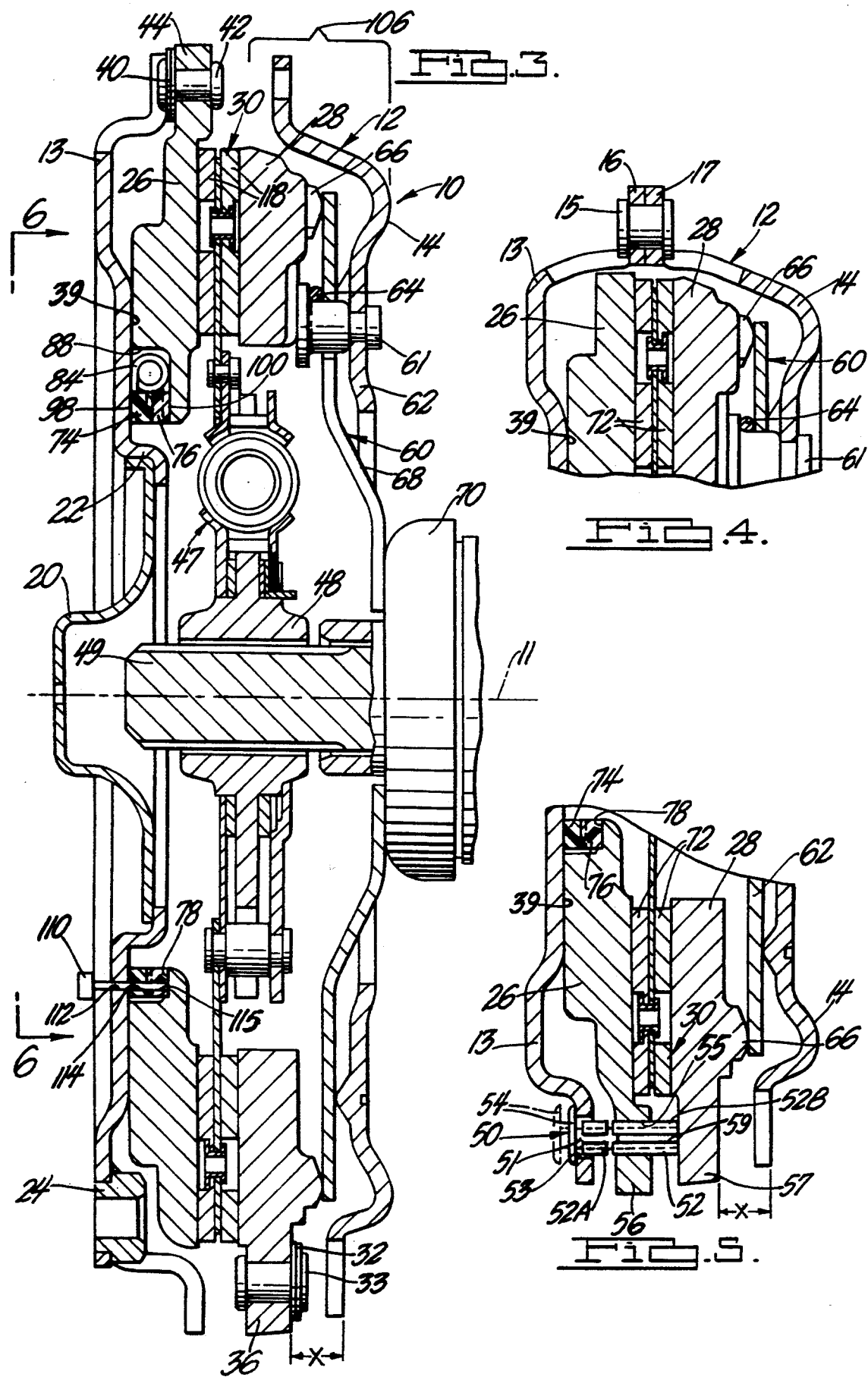

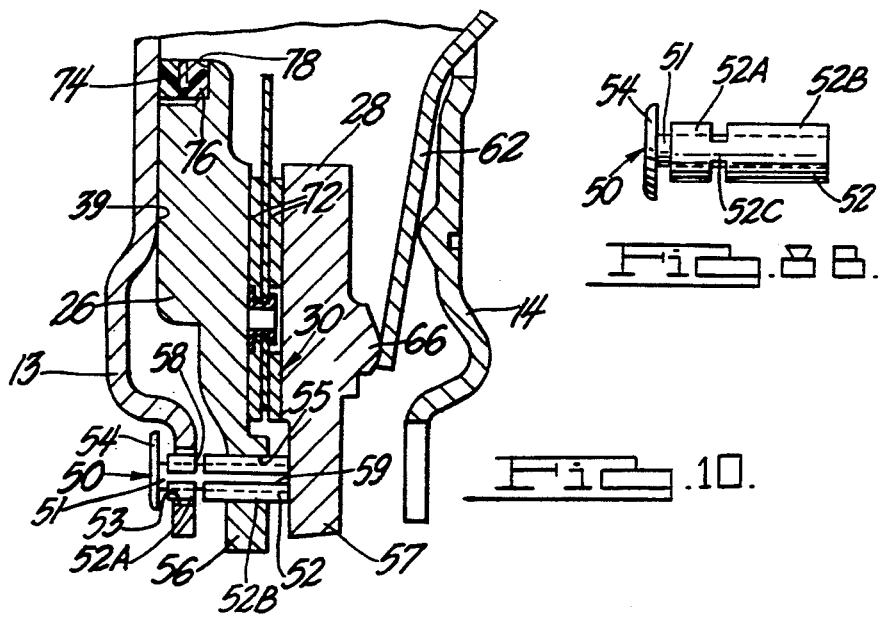
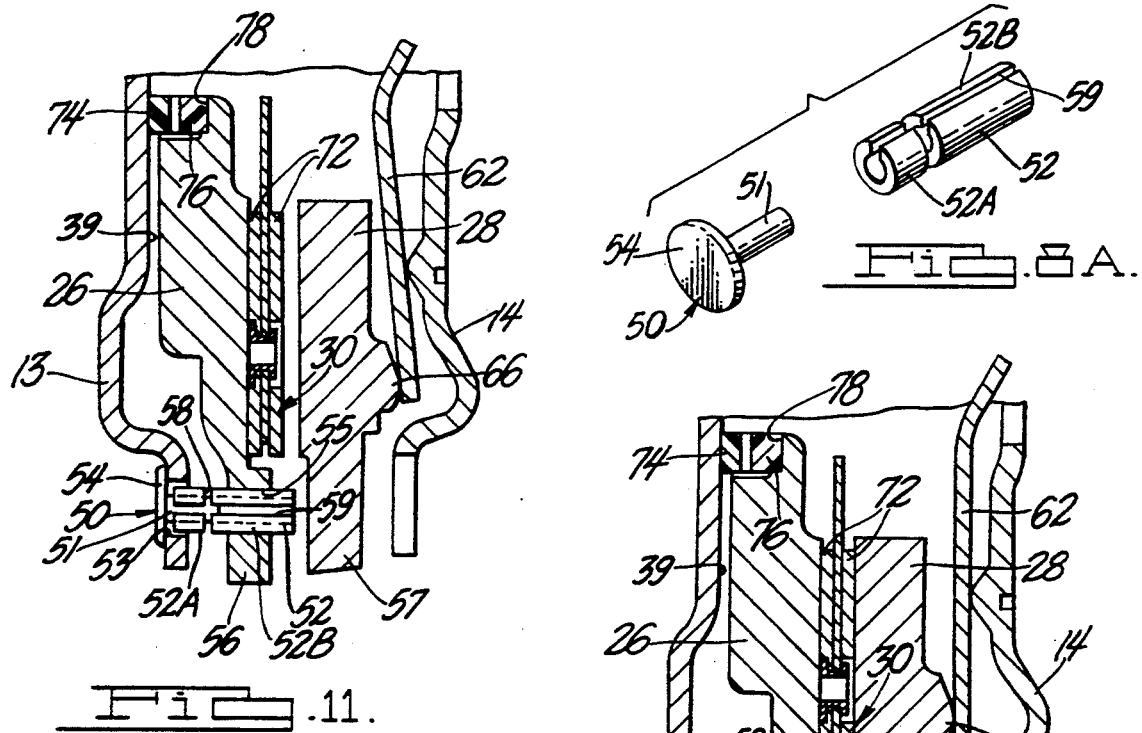
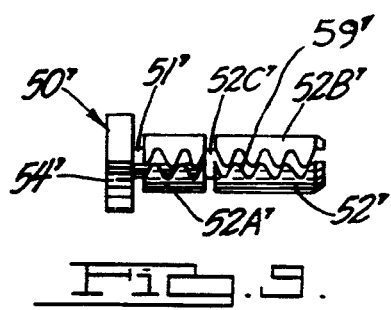
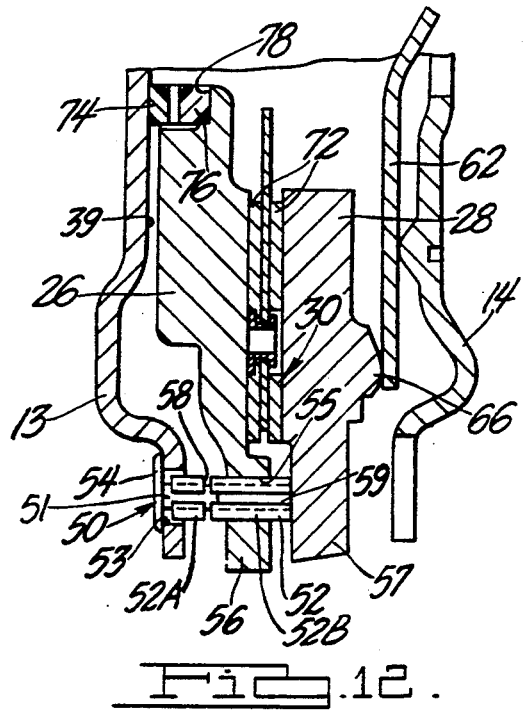
FIG. 10.
FIG. 8B.
FIG. 8A.
FIG. 11.
FIG. 9.
FIG. 12.

MOTOR VEHICLE MANUAL TRANSMISSION MODULAR CLUTCH ASSEMBLY

TECHNICAL FIELD

This invention relates to motor vehicle manual transmission modular clutch assemblies and more particularly to the inclusion therein of an engine flywheel and automatic wear adjustment.

BACKGROUND OF THE INVENTION

In an effort to simplify and quicken final vehicle assembly and service, attention has been directed to the modular construction of a motor vehicle including those with a foot operated clutch that drivingly connects the engine to a manual transmission. Typically, the clutch assembly is bolted to the rear face of a flywheel connected to the engine crankshaft and these components are covered by a bell housing that is bolted to the engine block. To service the clutch one must then reverse this assembly to gain access to replace parts or make an internal adjustment such as to compensate for wear in the clutch. U.S. Pat. No. 5,238,093 is an example of such piece meal assemblies and wherein manual adjustment is provided to relocate a diaphragm spring and pressure plate to compensate for wear. While the clamping force and release effort is maintained by this adjustable arrangement, the pedal travel is increased unless compensated for in the linkage to the clutch pedal. Various modular constructions have been proposed as well as various provisions for automatic wear adjustment within the clutch assembly itself. But these efforts have fallen short either in providing less than a full modular package and/or in not being able to include an adjusting arrangement that will automatically maintain the desired clutch pedal effort and travel as well as the desired clutch apply force as wear occurs.

For example, U.S. Pat. No. 5,191,810 discloses a modular form of construction but excludes both the flywheel and any automatic wear adjustment. U.S. Pat. No. 4,339,023 likewise excludes the flywheel but does have automatic wear adjustment for a twin plate clutch using a plethora of independent multi-spring biased tapered devices. These devices relocate only one of two pressure plates; i.e. the one that is sandwiched by the two driven plates, to maintain clearance wherein the clamping force will decrease and the pedal effort and travel will increase with such wear adjustment. U.S. Pat. No. 4,684,002 discloses a similar manner of wear adjustment in a twin clutch using different adjusting devices that have the same shortcomings. U.S. Pat. No. 4,832,164 does disclose automatic wear adjustment wherein the pressure plate and spring assembly are relocated to compensate for wear but the pedal travel is thereby increased. This arrangement like that in the above U.S. Pat. No. 5,238,093 is not suited for a modular construction of the entire clutch assembly including the flywheel.

SUMMARY OF THE INVENTION

The present invention combines the engine flywheel with the clutch assembly in a compact module wherein automatic wear release adjustment is incorporated that maintains the desired clutch release effort and travel as well as the desired clutch release force as wear occurs. The module comprises a two-piece cover that is adapted to be connected to the engine crankshaft and encloses the engine flywheel together with a diaphragm spring biased pressure plate and an interposed clutch plate that is adapted to be connected to the input shaft of a manual transmission.

Spring-torque straps connect the pressure plate to the cover for rotation therewith while permitting forced movement of the pressure plate by the diaphragm spring to engage the clutch and maintaining the pressure plate against the diaphragm during clutch release. Additional and separate spring-torque straps also connect the flywheel to the cover for rotation therewith and act to urge the flywheel toward the clutch plate and pressure plate as described later.

The desired clutch apply load for each module, whether new or having parts replaced such as the clutch plate, is determined prior to final assembly of the module by first building up a subassembly of its parts comprising the pressure plate, diaphragm spring and an associated cover half separate from the flywheel and its associated cover half. This subassembly is then set and held at the desired clutch load setting while the clutch plate, flywheel and other cover half are assembled therewith. In the complete assembly, the pressure plate contacts with travel limit pins that extend freely through apertures in the cover and are press fitted in bores through the flywheel. The limit pins have a head at one end that abuts with the cover and the pins extend past the flywheel and clutch plate to contact at their other end with the pressure plate when in its engaged position. A pair of flywheel positioning rings having opposing ramps are interposed side by side between the cover and flywheel. In the preferred embodiment, the rings are separate parts added to the clutch assembly, but it is also contemplated that the ring adjacent the cover could also be formed integral therewith. The rings are spring biased to expand apart by ramp action during clutch release so that they contact on their oppositely facing sides with the cover and flywheel to provide a wedge that holds the flywheel against the force of the diaphragm spring. These rings are temporarily held in a contracted condition during clutch assembly while the pressure plate is held at that position that produces the desired clutch load. With the flywheel installed, the travel limit pins are initially adjusted to this temporarily held set position of the pressure plate and then the flywheel positioning rings are released and allowed to expand relative to each other and form a wedge to establish whatever spacing is required between the flywheel and cover in order to maintain the desired clutch apply load. Then the temporary hold on the pressure plate is released and the flywheel positioning rings take over to maintain this flywheel in the set position. The diaphragm spring clamps the pressure plate, clutch plate and flywheel together against the expanded rings and has fingers that are adapted to be operatively connected to a clutch pedal to release the clutch. The clutch pedal presents a certain feel to the operator that is maintained for comfort purposes by the wear adjustment mechanism of the present invention.

As wear occurs at the linings on the clutch plate, the pressure plate is allowed to move further in the direction of the flywheel and forces the travel limit pins to move in their press fit by the same amount, i.e. the amount of wear. This relocates the heads of the flywheel travel limit pins away from the cover by the same amount so that when the clutch is released these pins then allow the flywheel to be moved by its spring-torque straps toward the clutch plate and pressure plate by a corresponding amount to a new position to compensate for the clutch wear. The flywheel positioning rings are conditioned to expand apart by their spring biased ramp action during clutch release so that they continuously contact on their oppositely facing sides with the cover and flywheel to provide a controlled wedge that adjusts in size for wear and then holds the flywheel against the force of the diaphragm spring on clutch re-engagement following movement of the flywheel to its new position.

The flywheel positioning rings and travel limit pins thus co-operatively position and hold the flywheel to adjust for wear independently of the pressure plate and diaphragm spring. The latter are thus not affected by the wear adjustment and therefore the release effort and travel as well as the clutch clamping force are maintained and the operator continues to sense the same clutch feel even though wear adjustment has occurred. Moreover, the life of the clutch is dependent on clamp load and by maintaining the clamp load substantially constant (neither too high nor too low), the life of the clutch is prolonged.

It is therefor an object of the present invention to provide a new and improved motor vehicle manual transmission clutch module.

Another object is to provide a motor vehicle manual transmission clutch module incorporating an engine flywheel and automatic wear adjustment that maintains the desired clutch apply force and release effort and travel as wear occurs.

Another object is to provide a motor vehicle manual transmission clutch module incorporating an engine flywheel and automatic wear adjustment wherein the flywheel is positioned to effect wear adjustment that maintains the desired clutch apply force and release effort and travel as wear occurs.

Another object is to provide a motor vehicle manual transmission clutch module that is characterized by its compactness and inclusion of an engine flywheel that is utilized to effect automatic clutch wear adjustment without changing the clutch apply force and release effort and travel.

Another object is to provide a relatively simple and easy to manufacture, compact, low cost, highly reliable motor vehicle manual transmission clutch module that incorporates an engine flywheel and utilizes same to effect wear adjustment in a manner that maintains the clutch apply force and release effort and travel.

Another object is to provide a motor vehicle manual transmission clutch module having a clutch apply load that is set at assembly to a prescribed value and together with clutch release effort and travel is maintained as clutch wear occurs.

These and other objects, advantages and features of the invention will become more apparent from the following detailed description with reference to the accompanying drawings wherein:

BRIEF DESCRIPTION OF THE DRAWINGS

FIG. 3 is an enlarged view taken along the line 3—3 in FIG. 1 when looking in the direction of the arrows;

FIG. 4 is an enlarged view taken along the line 4—4 in FIG. 1 when looking in the direction of the arrows;

FIG. 5 is an enlarged view taken along the line 5—5 in FIG. 1 when looking in the direction of the arrows;

FIG. 8A is an exploded perspective view of the flywheel travel limit pin in FIG. 5;

FIG. 8B is a bottom view of the flywheel travel limit pin in FIG. 5;

FIG. 9 is a side view of another embodiment of the flywheel travel limit pins;

FIG. 10 is a view similar to FIG. 5 but showing the clutch in a worn condition and wear adjustment taking place;

FIG. 11 is a view similar to FIG. 10 but showing the worn clutch released following wear adjustment; and FIG. 12 is a view similar to FIG. 11 but showing the worn clutch engaged.

DETAILED DESCRIPTION OF THE PREFERRED EMBODIMENT

Figure 1:
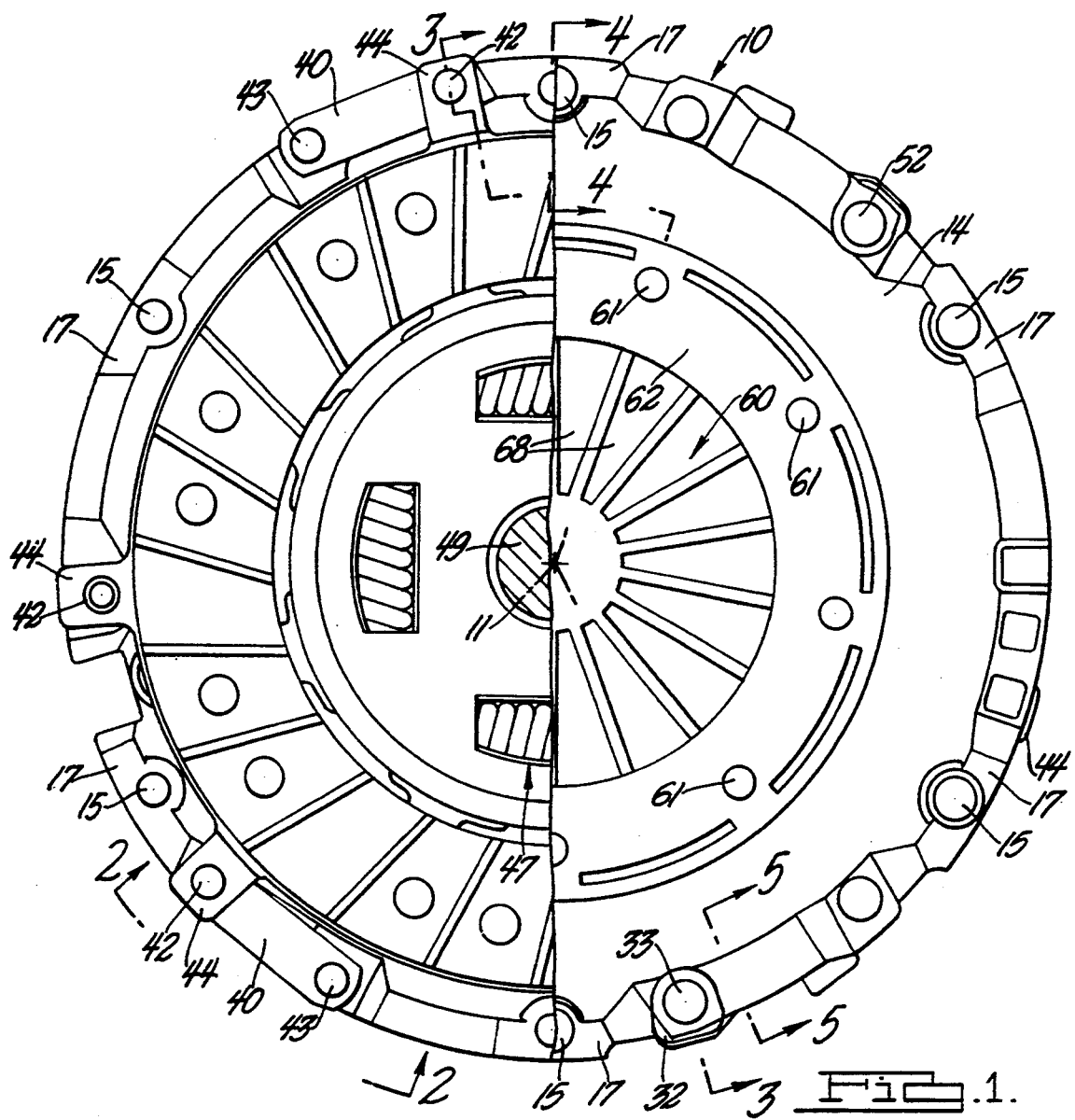
FIG. 1 is a fragmentary rear end view of a the clutch module according to the present invention.
Figure 2:
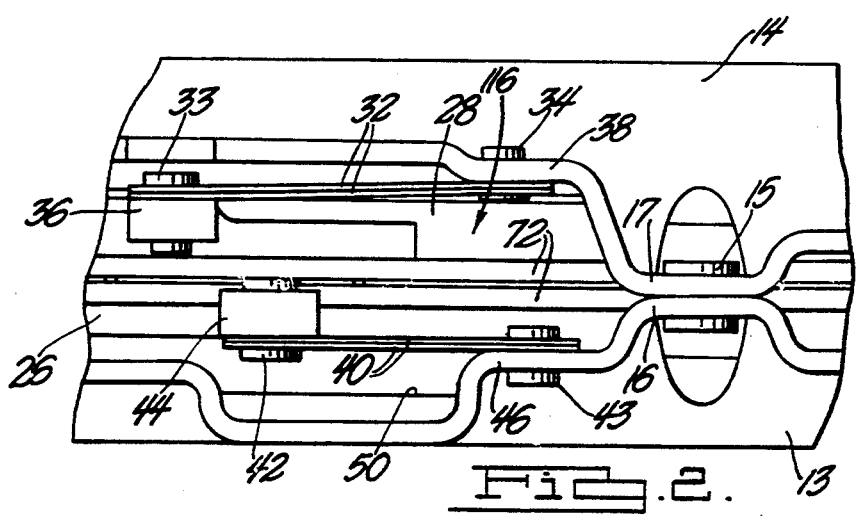
FIG. 2 is an enlarged view taken along the lines 2—2 in FIG. 1 when looking in the direction of the arrows.

Referring to FIGS. 1-7, there is illustrated a motor vehicle manual transmission clutch module 10 having a centerline or axis 11 about which the module rotates. The module 10 comprises a cover 12 of uniform wall thickness formed primarily of a front annular bowl shaped cover half 13 and a rear annular bowl shaped cover half 14. The cover halves 13 and 14 are fixed together by rivets 15 at mating radially extending peripheral flange portions 16 and 17, respectively, as seen in FIGS. 1, 2 and 4. A funnel shaped cover plate 20 of uniform wall thickness is press fitted in a central annular flange portion 22 in the front side of the front cover half to close this end of the module. The cover 12 is adapted to be connected to the rear end of an engine crankshaft(-not shown) by a plurality of nuts 24 welded to the front side of the front cover half 13 near its outer perimeter- (only one such nut being shown in FIG. 3). The nuts may also be fixed to the cover by other means and take other forms such as would provide their attachment with a press fit, staking, etc.

Mounted within the cover are an annular engine flywheel 26, annular pressure plate 28 and interposed clutch plate 30. The pressure plate is connected to the cover by a plurality of pairs of tangentially oriented spring-torque straps 32 that are arranged side to side, parallel to each other. The straps 32 are each fixed at their opposite ends by a rivet 33 and 34 to a radially outwardly extending ear 36 on the pressure plate and a recessed peripheral flange portion 38 at the interface of the rear cover half 14, respectively. Seen FIGS. 1-3. The flywheel is located opposite an interior radially extending annular wall 39 of the front cover half 13 and is connected to the cover by a plurality of pairs of tangentially oriented spring-torque straps 40 that are arranged side to side, parallel to each other like the pressure plate straps 32. The straps 40 are fixed at their opposite ends by a rivet 42 and 43 to a radially outwardly extending ear 44 on the flywheel and a recessed peripheral flange portion 46 at the interface of the front cover half 13, respectively, as seen in FIGS. 1—3. As mounted, both the pressure plate and flywheel rotate with the cover while being permitted to move axially against their respective straps. The clutch plate sandwiched by the flywheel and pressure plate is connected to a torque damping drive assembly 47 having an internally splined hub 48 that mates with a splined input shaft 49 of a manual transmission (not shown).

The relative axial position of the flywheel in the clutch assembly is determined by a plurality of flywheel travel limit pins 50 when the clutch is released. The pins 50 are equally angularly spaced about the front cover half and extend parallel to the clutch centerline. As illustrated in FIGS. 5 and 9, the pins 50 are of two part construction comprising a solid cylindrical body 51 on which a longitudinally split spring sleeve 52 made of rolled steel is press fitted. Each of the pins 50 extends freely through an aperture 53 in the front cover half 13 as seen in FIG. 5 and the pin body has an integral head 54 outside the cover that is abuttable therewith about the aperture 53. The sleeve 52 of each pin press fits in a bore 55 that extends through a radially outwardly extending ear 56 on the flywheel. The pin sleeve 52 extends past the clutch plate radially outward thereof to contact at the other end with a radially outwardly extending ear 57 on the pressure plate when the latter is in its clutch engaging position.

For initial clutch load setting and wear adjustment, the spring sleeve 52 of the pins 50 is provided with a press fit on the pin body 51 having a higher holding force than the combined resultant force of the straps 40 and the wear compensating tension springs 84 later described. This is accomplished by forming the spring sleeve 52 with a cross slot 58 at right angles to its normal longitudinal slit 59 and in an axial position that effectively separates the spring sleeve into two essentially independent press fit sections; namely, a short length expansible section 52A and a relatively long contractible section 52B joined by a short singular web 52C. See FIGS. 8A and 8B. The sleeve sections 52A and 52B have the same inner and outer diameter but different dimensional relationships in their press fit with the respective pin body 51 and the bore 55 in the flywheel that will create the desired differences in holding force. That is, the interference fit of the sleeve 52 in its expansible section 52A with the pin body 51 is greater or to a larger degree than that of its contractible section 52B in the bore 55 in the flywheel.

Another form of flywheel travel limit pin that provides for a closer tolerance control of the press fits is illustrated in FIG. 9 wherein parts similar to those of the pins 50 are referenced by the same numerals only primed. In the FIG. 9 pin embodiment, the pin 50' has the same body 51' and head 54' but now the spring sleeve 52' is a precision machined steel part having a saw tooth shaped longitudinal slit 59' and again the strategically located cross slot 58'. The reasons for the two different press fits of the travel limit pins, which may also be described as holding or retention forces, are explained in detail with the description of how the clutch load is initially set and wear adjustment is later effected.

It is also contemplated with respect to the flywheel travel limit pins that the connection between the pin bodies 51, 51' and the respective spring sleeves 52, 52' could be by connecting means other than a press fit as described above. For example, this connection could be effected by staking, a threaded connection and by welding.

A diaphragm spring 60 is mounted with a plurality of equally angularly spaced riveted fasteners 61 on the interior side of an annular radially extending wall 62 of the rear cover half. The spring is pivotal about a ring 64 captured between the fasteners and the cover and contacts near its periphery with an axially extending annular ridge 66 on the outer side of the pressure plate as seen in FIG. 3. The diaphragm spring is deflected at assembly and clamps the pressure plate, clutch plate and flywheel together to transmit torque from the cover to the clutch plate. The diaphragm spring has radially inwardly extending fingers 68 that are engaged and moved leftward as viewed in FIG. 3 to release the clutch by a throwout bearing 70. The straps 32 connecting the pressure plate to the cover are deflected during clutch engagement and during clutch release act to maintain the pressure plate against the diaphragm spring. The throwout bearing is operated by a clutch pedal through conventional type linkage not shown.

Figure 6:
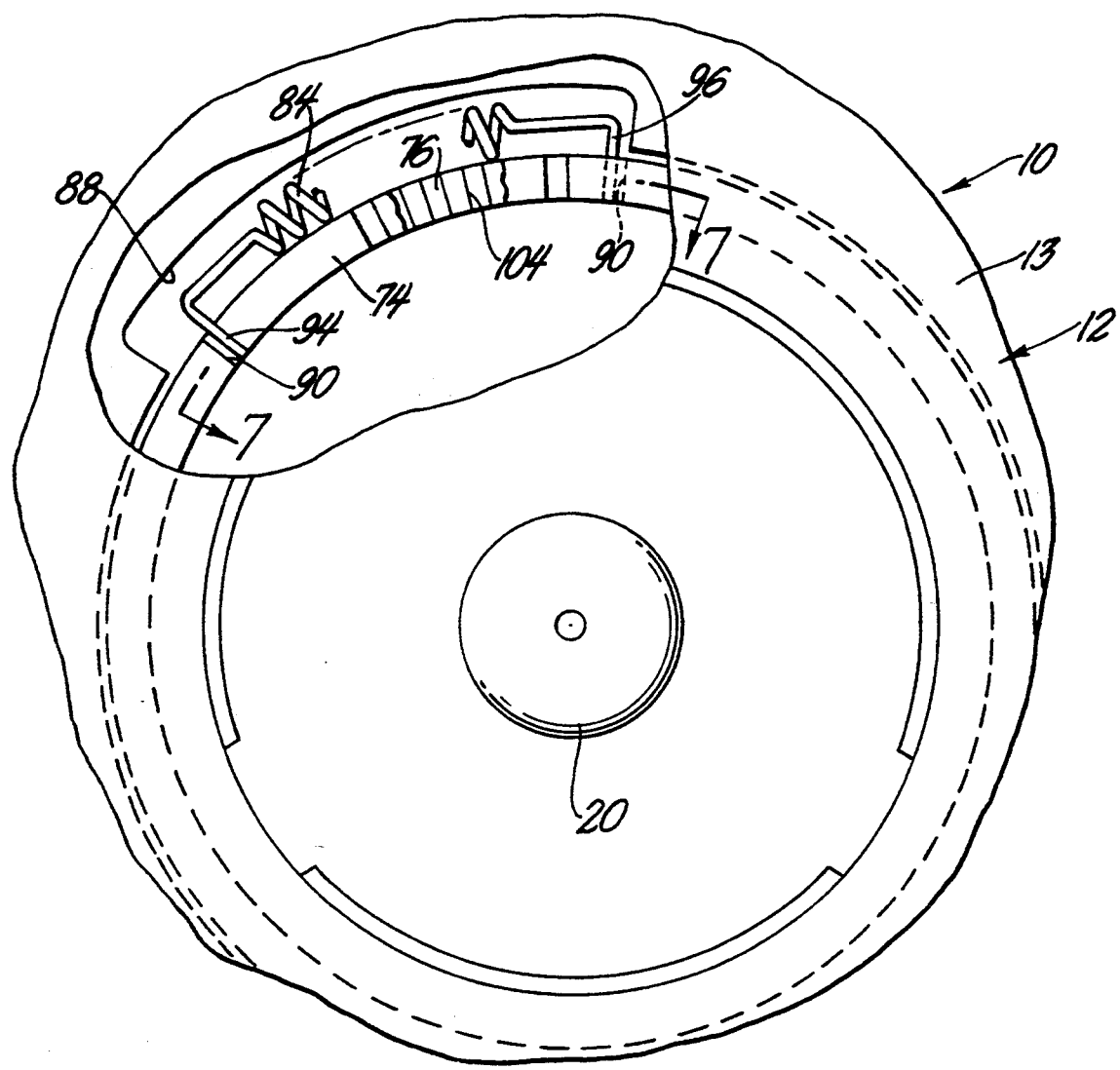
FIG. 6 is a partial fragmentary front end view taken along the line 6—6 in FIG. 3 when looking in the direction of the arrows.
Figure 7:
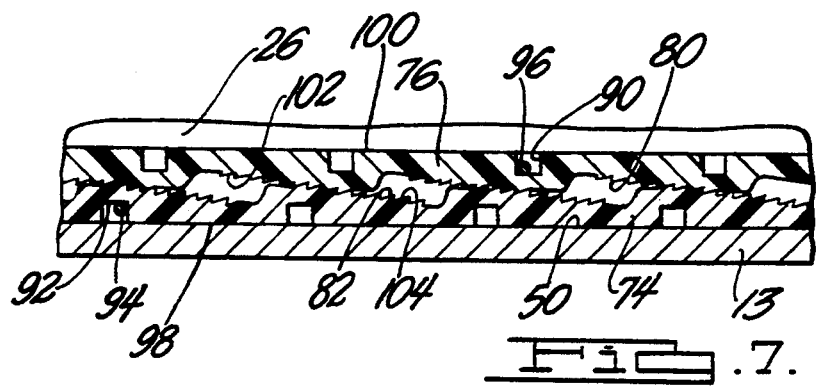
FIG. 7 is a view taken along the line 7—7 in FIG. 6 when looking in the direction of the arrows.

The flywheel is held against the force of the diaphragm spring 60 following initial assembly and subsequent clutch wear by a pair of spring biased wedge rings 74 and 76. As seen in FIGS. 3, 6 and 7, the rings which are referred to as flywheel holding rings because of their function are arranged side by side in a counterbore 78 in the center of the cover facing side of the flywheel and opposite the interior wall 39 of the front cover half. The rings 74 and 76 have a plurality of angularly spaced opposing ramps 80 and 82 at their interfaces that extend in an annular direction and co-operate to separate the rings when they are rotated or turned relative to each other about the module centerline. The ring 76 is urged to separate from the other ring 74 by this ramp or cam action by a plurality of coiled tension springs 84 that are spaced about the rings and received in pockets 88 in the counterbore 78 radially outward of the rings. The springs 84 are connected to the rings by radial slots 90 and 92 in the outer sides of the rings 74 and 76 that respectively receive radially inwardly extending straight ends 94 and 96 of the springs. The rings 74 and 76 are forced by their spring biased ramps 80 and 82 to continuously contact on their oppositely facing sides 98 and 100 with the interior cover wall 39 and the bottom of the counterbore 78 in the flywheel. During clutch release the rings are caused by their springs 84 to expand relative to each other and form a wedge that then holds the flywheel against the force of the diaphragm spring on subsequent clutch engagement. To provide this wedging action, the ramps are inclined at a low angle such as 37 degrees to a plane perpendicular to the module centerline. The ramps 80 and 82 may also be formed with small steps 102 and 104 that do not interfere with the ramping action and interlock to provide small detented incremental advancement of the flywheel by the ramping action in adjusting for wear as described in more detail later. It is also contemplated that the wedge ring 74 could be formed integral with the front cover half 13 with its ramps 80 and steps 102 formed directly on the inner slide of this cover half.

The actual clutch apply load for each module is determined prior to its complete assembly by first building up a subassembly 106 of its parts (see FIG. 3) comprising the pressure plate 28, diaphragm spring 60 and associated rear cover half 14 separate from the clutch plate 30, flywheel 26 and its associated front cover half 13. In this subassembly, the pressure plate and rear cover half 13 are then pressed together to the point where the diaphragm spring 60 produces the desired clutch apply load at which point their dimensional relationship is then determined. For example, the dimensional relationship of the rear cover half 14 and the pressure plate 28 at one of its ears 36 is externally accessible and may be measured parallel to the module centerline as indicated by the dimension X in FIGS. 3 and 5. Having determined the dimension X, the remainder of the module is assembled. For this final assembly, the rings 74 and 76 are fully contracted and temporarily held in this condition. This is accomplished as illustrated in FIG. 3 by an assembly pin 110 that is inserted through a hole 112 in the front cover half 13 and into holes 114 and 115 in the respective rings that align with each other in this condition and are in turn alignable with the cover hole 112 by turning the rings in the counterbore 78. With the rings 74 and 76 temporarily held fully contracted by the assembly pin 110, the remaining parts of the module including the clutch plate 30, flywheel 26 and front cover half 13 are assembled with the subassembly 106 to complete the module. During this final assembly, the flywheel 26 is resisted by its spring-torque straps 40 in being moved to contact with the interior wall 39 of the front cover half 13 as shown in FIG. 3 and this provides for spring forced return movement of the flywheel toward the pressure plate to compensate or adjust for wear as later described in detail. The pressure plate 36 is positioned and held at the X clutch load dimension to set the clutch apply load in the assembly by access to the pressure plate through angularly spaced openings 116 in the cover at the interface of the cover halves, one such opening being illustrated in FIG. 2 and formed by the recessed peripheral flange portions 38 and 46 of the respective rear and front cover half 14 and 13. The assembly pin 110 is then removed allowing the ring 76 to be advanced by the springs 84 until it contacts with the flywheel with the latter and the clutch plate 30 then sandwiched against the pressure plate 28 and in which condition the flywheel barely makes contact with the interior annular wall 39 of the front cover half 13 or is slightly spaced therefrom. In either event, the rings 74 and 76 then establish a wedge between the flywheel and the front cover half 13. At this time the flywheel travel limit pins 50 (50)' are adjusted externally of the cover at their head 60 by pushing on the latter until the inner end of the associated sleeve 52 bottoms on the respective ear 57 of the pressure plate 28 and thereafter forcing the associated pin body 51 further into section 52A of the sleeve until the head 60 bottoms on the front cover half 13. This initial adjustment of the travel limit pins 50 is depicted in phantom line in FIG. 5 and sets the pins to adjust for subsequent travel of the flywheel as it is advanced by its spring-straps 40 toward the pressure plate in adjusting for wear. The module assembly is now complete and the temporary hold on the pressure plate is released whereafter the wedge action of the rings 74 and 76 then holds the clutch apply load setting and the wear adjusting arrangement is then ready to adjust for wear at this setting.

The clutch plate has angularly arranged linings 118 riveted to the opposite sides thereof that are contacted by the pressure plate and flywheel respectively to aid in the torque transmittal and these linings will wear in clutch usage. As such wear occurs, there is a resulting decrease in the stackup dimension of the flywheel, clutch plate and pressure plate between the diaphragm spring and the rear wedge ring 76 that the flywheel was initially installed against. The new or factory installed condition is seen in FIG. 5 and a worn condition is illustrated in FIG. 10. In the worn condition with the clutch engaged, the pressure plate as seen in the latter illustration has moved farther toward the flywheel as a result of this wear and in doing so forces the flywheel travel limit pins 50 to move in their press fit at their section 52B with the flywheel by the same amount, i.e. the amount of wear at the clutch linings. This relocates the head 54 of the limit pins away from the cover by the same amount so that when the worn clutch is released as illustrated in FIG. 11 the limit pins then allow the flywheel to be moved by its spring-torque straps 40 toward the pressure plate by a corresponding amount at which point the limit pins again abut with the cover to hold the flywheel against further movement. In this wear adjustment operation, the limit pins 50 do not adjust from their initial length adjustment during module assembly by the press fit of the sleeve section 52A on the pin body 51 being of larger holding force than that between the other sleeve section 52B and its accommodating bore 55 in the flywheel. Furthermore, the limit pins 50 hold this position by the press fit of their pin body 51 in its sleeve section 52A being of sufficient magnitude to hold the flywheel against the force of the straps 40 when the limit pins bottom on the front cover half 13. This new position of the flywheel is then held for subsequent clutch engagement as illustrated in FIG. 12 by the rings 74 and 76 with the latter ring having been forced to follow the flywheel by the action of the springs 84 and the ring ramps 80 and 82. It will also be understood that while the clutch load setting and wear adjustment has been described with reference to the pins 50, the same results occur when using the other limit pins 50'.

Because the position of the flywheel is adjusted to compensate for wear and not that of the pressure plate and/or diaphragm spring mounting, there is no change in the force applied by the diaphragm to engage the clutch as wear occurs nor is there any change in the effort and travel required of the spring fingers to release the clutch. The clutch module thus maintains the desired clutch apply load and the same operator feel and requires no maintenance for the full useful life of the clutch plate linings.

The above described preferred embodiment is illustrative of the invention which may be modified within the scope of the appended claims.

What is claimed is:

1. A modular clutch assembly comprising a rotary cover adapted to be drivingly connected to a motor vehicle engine and enclosing a flywheel and a pressure plate and a diaphragm spring and a clutch plate, said clutch plate having friction linings on opposite sides thereof and interposed between said flywheel and said pressure plate and adapted to be connected to a manual transmissions first and second spring-torque straps respectively connecting said pressure plate and said flywheel to said cover, said diaphragm spring mounted on said cover and adapted to act on said pressure plate to clamp said clutch plate at said friction linings between said pressure plate and said flywheel with a predetermined clutch apply force when said flywheel is held in an initial position relative to said diaphragm spring, said diaphragm spring operable on a certain release effort applied thereto and a certain amount of release travel thereof to release said clutch plate, and flywheel positioning and holding means for initially holding said flywheel in said initial position for clutch plate engagement and during clutch plate release allowing and limiting movement of said flywheel by said second spring-torque straps from said initial position toward said diaphragm spring to a wear adjusting position through a distance corresponding to the amount of wear occurring at said friction linings and then holding said flywheel in said wear adjusting position against the force of said diaphragm spring during subsequent clutch plate engagement to thereby maintain said predetermined clutch apply force and diaphragm release effort and travel as wear of said friction linings occurs.

2. A modular clutch assembly as set forth in claim 1 wherein said flywheel positioning and holding means includes travel limit pins operatively associated with said cover and said flywheel and said pressure plate for determining the positioning of said flywheel.

3. A modular clutch assembly as set forth in claim 1 wherein said flywheel positioning and holding means includes wedge means operatively associated with said cover and said flywheel for holding the positioning of said flywheel.

4. A modular clutch assembly as set forth in claim 1 wherein said flywheel positioning and holding means includes travel limit pins operatively associated with said cover and said flywheel and said pressure plate for determining the positioning of said flywheel, and wedge means operatively associated with said cover and said flywheel for holding said flywheel in the positions determined by said travel limit pins.

5. A modular clutch assembly as set forth in claim 1 wherein said cover comprises two bowl shaped parts of uniform thickness having mating peripheral flanges with recessed portions that co-operatively form openings for accessing the interior of said cover means to aid in establish said predetermined clutch apply force.

6. A modular clutch assembly as set forth in claim 2 wherein said travel limit pins each comprise a pin received through an aperture in said cover, a sleeve press fitted on said pin and received with a press fit in a hole through said flywheel and adapted to be contacted at a projecting end thereof by said pressure plate on clutch plate engagement, said pin having a head that contacts said cover to limit movement of said flywheel toward said diaphragm spring, said press fit of said sleeve on said pin adapted to temporarily release with an external assembly force during assembly of said modular clutch assembly to adjust said head relative to said sleeve and thereby determine said initial flywheel position, and said press fit of said sleeve in said hole adapted to temporarily release with the force of said pressure plate and thereby determine said wear adjusting position of said flywheel.

7. A modular clutch assembly as set forth in claim 3 wherein said wedge means comprises a pair of rings interposed side by side between said cover and said flywheel, said rings having a plurality of oppositely facing complementary ramps that cooperate on relative angular movement between said rings in one direction to force said rings apart to maintain contact with said cover and said flywheel during clutch plate release, spring means for urging relative angular movement between said rings in said one direction when said clutch plate is released and said flywheel has been moved to said wear adjusting position wherein said co-operating ramps then form a wedge to hold said flywheel in said wear adjusting position.

8. A modular clutch assembly as set forth in claim 6 wherein said sleeve is formed of sheet metal and has a longitudinal slit, and a cross slit that divides said sleeve into an expansible section providing said press fit on said pin with a high degree of retention force and a contractible section providing said press fit in said hole in said flywheel with a relatively low degree of retention force.

9. A modular clutch assembly as set forth in claim 6 wherein said sleeve is formed of precision machined metal and has a longitudinal slit, and a cross slit that divides said sleeve into an expansible section providing said press fit on said pin with a high degree of retention force and a contractible section providing said press fit in said hole in said flywheel with a relatively low degree of retention force.

10. A modular clutch assembly as set forth in claim 3 wherein said wedge means is mounted in a recess in said flywheel.

11. A modular clutch assembly as set forth in claim 7 wherein said spring means comprises a plurality of tension springs spaced about said rings, said springs each having radially inwardly extending legs with one of said legs received in a slot in an outer side of one of said rings and the other leg received in a slot in an outer side of the other ring.

12. A modular clutch assembly as set forth in claim 7 wherein said complementary ramps having steps spaced there along that engage to provide incremental detented ramping action in establishing said wedge.

13. A modular clutch assembly as set forth in claim 6 wherein said sleeve is adapted to have a high degree of press fit on said pin and a relatively low degree of press fit in said hole in said flywheel.

14. A modular clutch assembly as set forth in claim 7 further including an assembly device adapted to temporarily hold said rings in a contracted condition with respect to said flywheel during final assembly of the clutch modular assembly to enable establishment of said initial flywheel position.

15. A modular clutch assembly as set forth in claim 14 wherein said assembly device comprises an assembly pin adapted to be received in a hole in said cover and holes in the respective said rings that align when said rings are contracted.

16. A modular clutch assembly comprising a rotary cover enclosing a flywheel and a pressure plate and a clutch plate, said clutch plate having friction linings on opposite sides thereof and interposed between said flywheel and said pressure plate, said pressure plate and said flywheel separately operatively connected to said cover for rotation therewith and axial movement relative thereto, said pressure plate adapted to clamp said clutch plate at said friction linings between said pressure plate and said flywheel with a predetermined clutch apply force when said flywheel is held in an initial position relative to pressure plate, and flywheel positioning and holding means for initially holding said flywheel in said initial position for clutch plate engagement and during release of said clutch apply force allowing and limiting movement of said flywheel from said initial position toward said pressure spring means for urging axial movement of said flywheel toward said pressure plate to a wear adjusting position through a distance corresponding to the amount of wear occurring at said friction linings and then holding said flywheel in said wear adjusting position against the force of said pressure plate during subsequent clutch plate engagement to thereby maintain said predetermined clutch apply force.

17. A modular clutch assembly as set forth in claim 16 wherein said flywheel positioning and holding means includes travel limit pins operatively associated with said cover and said flywheel and said pressure plate for determining the positioning of said flywheel.

18. A modular clutch assembly as set forth in claim 16 wherein said flywheel positioning and holding means includes wedge means operatively associated with said cover and said flywheel for holding the positioning of said flywheel.

* * * * *